(12) United States Patent
Rodriguez

(10) Patent No.: US 6,769,120 B1
(45) Date of Patent: Jul. 27, 2004

(54) CALENDAR-INDUCED PROGRAM EXECUTION

(75) Inventor: Herman Rodriguez, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/343,628

(22) Filed: Jun. 30, 1999

(51) Int. Cl.[7] ............................. G06F 9/46; H04M 3/00
(52) U.S. Cl. ........................ 718/100; 718/102; 455/418
(58) Field of Search ................................ 709/100, 102, 709/103, 104, 105; 455/414, 418

(56) References Cited

U.S. PATENT DOCUMENTS

| | | | |
|---|---|---|---|
| 5,491,824 A | 2/1996 | Koshi ........................ | 395/732 |
| 5,493,642 A | 2/1996 | Dunsmuir et al. .......... | 395/161 |
| 5,566,339 A | 10/1996 | Perholtz et al. ............ | 395/750 |
| 5,619,656 A | 4/1997 | Graf ........................ | 395/200.11 |
| 5,680,548 A * | 10/1997 | Trugman ................... | 709/226 |
| 5,815,652 A | 9/1998 | Ote et al. ............... | 395/183.07 |
| 5,887,141 A * | 3/1999 | Trugman ................... | 709/227 |
| 6,044,393 A * | 3/2000 | Donaldson et al. ......... | 709/100 |
| 6,167,379 A * | 12/2000 | Dean et al. ................ | 705/9 |
| 6,209,025 B1 * | 3/2001 | Bellamy .................... | 709/217 |
| 6,275,810 B1 * | 8/2001 | Hetherington et al. ...... | 705/9 |
| 6,310,947 B1 * | 10/2001 | Polcyn .................... | 379/211.01 |
| 6,317,593 B1 * | 11/2001 | Vossler ..................... | 455/414 |
| 6,397,359 B1 * | 5/2002 | Chandra et al. ........... | 714/712 |

FOREIGN PATENT DOCUMENTS

WO    WO 98/12872    3/1998    ............ H04N/5/44

* cited by examiner

Primary Examiner—Meng-Al T. An
Assistant Examiner—Syed J Ali
(74) Attorney, Agent, or Firm—David A. Mims, Jr.; Dillon & Yudell LLP

(57) ABSTRACT

A user's calendar program is configured to "induce" execution of scheduled programs or system activities. Utilizing a scheduler program, the user can configure the system to run certain recurring tasks but control system operation with varying results based on the controlling inducement factors received from the calendar program. When creating an event or activity entry in the calendar program, the user associates an inducement value with that entry. On the date of the entry, the scheduler program, before initiating execution of any scheduled tasks, obtains the inducement value(s) for that date. The inducement value(s) are logically combined with execution values to control execution of scheduled tasks. For instance, is a user is attending a remote conference, a recurring task for system backup and virus scanning will run on a different schedule that if the user is actively using the machine on a daily basis between backups, while if the user is on vacation, system pop-ups and dialogs for an application may not be executed.

28 Claims, 5 Drawing Sheets

CALENDAR-INDUCED PROGRAM EXECUTION

RELATED APPLICATIONS

The present invention is related to the subject matter of the following commonly, assigned, copending U.S. patent applications: Ser No. 09/343,626 U.S. Pat. No. 6,457,132 entitled "CALENDAR BASED POWER MANAGEMENT" and filed Jun. 30, 1999; and Ser. No. 09/343,629 U.S. Pat. No. 6,651,173 entitled "CALENDAR-INDUCED DESKTOP SECURITY" and filed , Jun. 30 1999. The content of the above-referenced applications is incorporated herein by reference.

BACKGROUND OF THE INVENTION

1. Technical Field

The present invention generally relates to periodic or recurrent program execution in data processing systems and in particular to reconciling periodic or recurrent program execution in a data processing system with a user calendar for the user of the data processing system. Still more particularly, the present invention relates to employing a user calendar to induce scheduling of program or system activities in a data processing system.

2. Description of the Related Art

Current technology for performing periodic operations such as recurrent downloads, data backups, or virus scans on personal computers is accomplished utilizing a scheduler program. The scheduler program typically takes as input the desired frequency of an operation, and is launched on startup to run in the background. Utilizing the system time and date settings, the scheduler determines whether the specified period has elapsed and, if so, begins execution of the corresponding task.

Once scheduled, the execution of a periodic task normally takes place without regard to the way in which the machine is currently being utilized, or to the behavior of the end-user. For example, a typical daily download of a web newspaper may take place on every weekday in the morning, but not on weekends. If the user is travelling on business during the week, the scheduler still initiates executions of the program to download the newspaper even though there is nobody to read the download.

Another example entails performing a virus scan at predetermined intervals, such as weekly. Typically, the virus scan is performed without regard to machine usage. Thus, if the machine has been powered off when the appropriate interval elapses, the virus scan may run a few minutes after the system is next powered on. If the user is utilizing the machine at the time (which is likely), the virus scan, even running in the background, consumes processor cycles which could be allocated to the user's task instead, degrading performance for the duration of the virus scan.

Other problems also attend current periodic execution techniques. Unnecessarily running certain programs such as periodic downloads and backups adds unneeded network traffic. Leaving systems running solely for the purpose of executing scheduled programs such as virus scans, downloads, or backups is energy wasteful. Diagnostic messages popping up during scheduled execution of an operation when the user is away merely suspend the system since nobody is present to respond or manually intervene and take corrective action.

It would be desirable, therefore, to enable different action to be taken when the user is away and unavailable or utilizing the system than if the user were available and the system were idle.

SUMMARY OF THE INVENTION

It is therefore one object of the present invention to provide improved periodic or recurrent program execution in data processing systems.

It is another object of the present invention to provide reconciliation of periodic or recurrent program execution in a data processing system with a user calendar for the user of the data processing system.

It is yet another object of the present invention to provide a method of employing a user calendar to induce scheduling of program or system activities in a data processing system.

The foregoing objects are achieved as is now described. A user's calendar program is configured to "induce" execution of scheduled programs or system activities. Utilizing a scheduler program, the user can configure the system to run certain recurring tasks but control system operation with varying results based on the controlling inducement factors received from the calendar program. When creating an event or activity entry in the calendar program, the user associates an inducement value with that entry, On the date of the entry, the scheduler program, before initiating execution of any scheduled tasks, obtains the inducement value(s) for that date. The inducement value(s) are logically combined with execution values to control execution of scheduled tasks. For instance, is a user is attending a remote conference, a recurring task for system backup and virus scanning will run on a different schedule than if the user is actively using the machine on a daily basis between backups, while if the user is on vacation, system pop-ups and dialogs for an application may not be executed.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
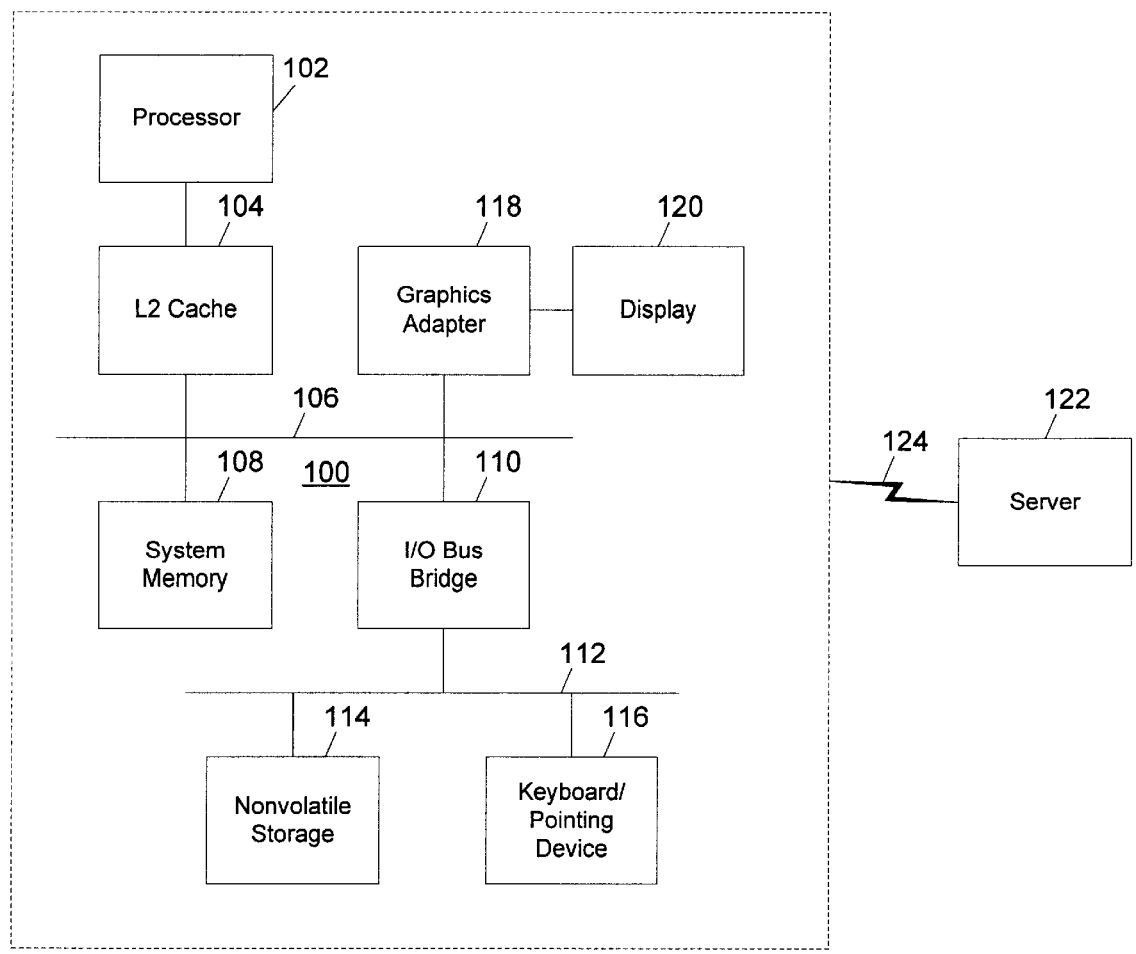
FIG. 1 depicts a data processing system and network in which a preferred embodiment of the present invention may be implemented.

With reference now to the figures, and in particular with reference to FIG. 1, a block diagram of a data processing system and network in which a preferred embodiment of the present invention may be implemented is depicted. Data processing system 100 includes a processor 102, which is connected in the exemplary embodiment to a level two (L2) cache 104, connected in turn to a system bus 106.

Also connected to system bus 106 is system memory 108 and input/output (I/O) bus bridge 110. I/O bus bridge 110 couples I/O bus 112 to system bus 106, relaying and/or transforming data transactions from one bus to the other. Peripheral devices such as nonvolatile storage 114, which may be a hard disk drive, compact disk read-only memory (CD-ROM) drive, or digital video disk (DVD) drive, and keyboard/pointing device 116, which may include a conventional mouse, a trackball, or the like, are connected to I/O bus 112. Data processing system 100 further includes graphics adapter 116 connected to system bus 106, receiving primitives for rendering from processor 102 and generating pixels for display 120.

The operation of data processing system 100 is well known to those skilled in the art. A basic input/output system (BIOS), power-on self-test (POST), and various startup routines initialize the hardware and permit interaction between hardware components. An operating system, such as a version of the Windows operating system available from Microsoft Corporation of Redmond, Wash., provides a platform for execution of applications and for basic user interaction, such as display of information or manipulation of a cursor within the display by a pointing device. Operating system device drivers allow software components to interact with and control hardware components. Data processing system may be connected to a server 122 via a communications link 124 in accordance with known networking techniques.

In the present invention, either the operating system includes a program scheduler and a calendar utility or program scheduler and calendar applications run on top of the operating system. The program scheduler and calendar functionality need not be discrete utilities or applications, but may rather be simply different aspect of an operating system or application. In the present invention, the program scheduler and calendar operate in conjunction as described below.

Figure 2:
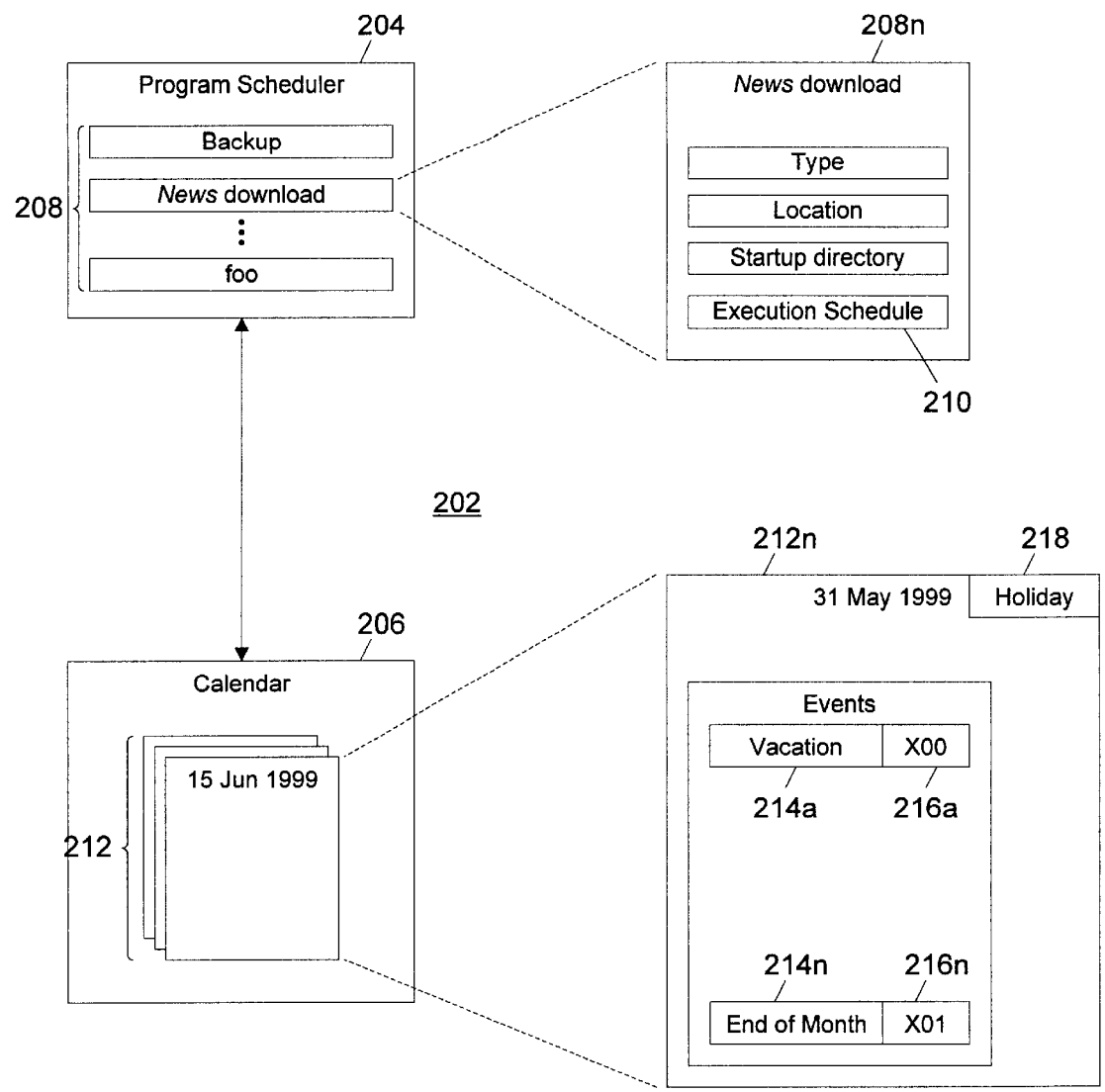
FIG. 2 is a diagram of a calendar induced program execution system in accordance with a preferred embodiment of the present invention.

Referring to FIG. 2, a diagram of a calendar induced program execution system in accordance with a preferred embodiment of the present invention is illustrated. The system 202 executes within a data processing system and/or network of the type depicted in FIG. 1 and described above. Calendar-induced program execution system 202 includes a program scheduler module 204 and a calendar module 206.

Program scheduler 204 allows the user to configure the system to run selected tasks or system activities on a recurring basis, automatically and without user intervention. Program scheduler 204 includes a plurality of execution entries 208 each identifying a program to be automatically executed at a specified date and time or at a specified frequency (e.g., daily, weekly, monthly, etc.). Each execution entry 208n includes a variety of parameters and information regarding the program to be executed, including an execution schedule value 210. Execution schedule value 210 is set by program scheduler 204 based on the system date and time, and specifies whether the corresponding program should be executed on or after the current date and at or after the present time.

Program scheduler 204 may thus compare the present date and time with the specified execution date and time for the program to set execution schedule value 210, or may alternatively compute an elapsed time since a last execution of the program. Regardless of the computation employed, program scheduler 204 sets execution schedule value 210 to indicate whether the program should be executed (e.g., "X01" to indicate that the program should be run and "X00" to indicate that the program should not be run).

Calendar 206 includes a plurality of data objects or records 212 for each date within a relevant period, such as any current or future dates within a given year and/or for which events have been scheduled. Each date object 212n may contain a number of events or activity entries 214a–214n for a user. Events 214a—214a may be user specified, for appointments, meetings, trips, etc., or may be automatically generated by calendar 206, such as end-of-month reminders and the like.

Each event 214a–214n includes a corresponding inducement value 216a–216n. For automatically generated entries 214a–214n, the corresponding inducement value 216a–216n may also be automatically set according to a previously specified rule. For user specified entries 214a–214n, the corresponding inducement value 216a–16n may be set by prompting the user, upon creation of the event entry, to select a type of event or activity being entered (e.g., appointment, invitation, conference, business trip, vacation, video conference, to-do reminder, anniversary, etc.). The inducement value 216a–216n may then be set based on the event type selected by the user. Alternatively, the inducement value 216a–216n may be set by prompting the user to answer one or more questions when the event entry is created (e.g., "Will you be out of the office for this event?" or "Will you be needing your laptop for this event?"), then setting the inducement value 216a–216n based on the user's answers.

The inducement value 216a–216n of an event entry 214a–214n specifies the relevance of the associated event to execution of programs configured for automatic execution by program scheduler 204. The inducement value 216a–216n specified for an event entry within calendar program 206 defines the effect of the event on execution of scheduled programs. Thus, for example, an inducement value (e.g., "X00") associated with a "Vacation" entry in calendar program 206 may cause a normally scheduled program—say, daily download of a Web newspaper—not to be executed on the dates marked with a "Vacation" entry by the user. This allows different action to be taken by scheduler program 204 when the user is away than might be taken if the user were available. In the above example, since the user is on vacation and presumably will not be available to read any downloaded material (excluding the case of mobile computing), the scheduled daily download may be suspended, eliminating unnecessary network traffic. The inducement value associated with some events, however, may be set to a null value, indicating that the event has no relevance to scheduled execution of programs (e.g., a "To-Do" reminder).

Calendar program 206 interfaces with scheduler program 204 to affect the execution of scheduled tasks by sending the inducement value for the current date. The inducement values 216a–216n may be hierarchical, such that one inducement value for, say, a "Vacation" type entry effectively overrides an inducement value for a different event entry 214a–214n for the same date 212n, such as an "End-of-Month" type entry. Calendar program 206 may thus send a "highest" or "lowest" inducement value for any event entry 214a–214n within a given date 212n to scheduler program 204.

Alternatively, calendar program 206 may simply send all inducement values for event entries within a given date to scheduler program 204, allowing scheduler program 206 to determine the combined effect on execution of specific tasks. This may be particularly desirable if different event entry inducement values affect different tasks in different or potentially conflicting manners. For example, a "Remote Business Meeting" event entry inducement value may suspend daily download of a Web newspaper but not affect a scheduled backup, while an "End-of-Month" event entry inducement value may not affect download over a local modem but may delay a system backup to a network server to reduce network traffic for other tasks (e.g., closing accounts). The confluence of two such entries on a given date may require conflict resolution by scheduler program 204.

As may be inferred from the above description, different scheduled tasks may be affected differently by a given inducement value returned from calendar program 206. One task may be suspended or delayed by a given inducement value or values, while another task may be unaffected and execute as schedule. The range of possibilities is limited only by the number of unique inducement values 216a–216n and the alternatives for program execution dependent on the inducement value which are implemented.

In addition, the inducement value received from calendar program 206 may not only affect whether a given program executes, but also the manner in which that program executes. For instance, if the inducement value for a given date indicates that the user will be unavailable (e.g., on vacation), an application may execute with dialogs and pop-ups disabled since manual intervention by the user is not possible. This may prevent a system from being needlessly suspended when nobody is able to respond to a prompt or take corrective action for a problem.

The inducement value(s) for a given date 212n are preferably logically combined with execution values specifying whether the scheduled program is to be run given the received inducement values. The logic required is simplified by the need only to specify when a program, scheduled to execute by default, should NOT execute, or should execute in an altered manner. Thus, the logical combination may involve simply ANDing the execution and inducement values and then determining whether a result suspends or modifies execution. For instance, if the user is on vacation and the system has been configured to automatically download a Web newspaper, the calendar 206 may inform the scheduler program 204 that the user is on vacation by sending it an inducement value of "X00". The scheduler 204 then ANDs this inducement value with the predefined execution schedule value, daily="X01". The resultant value "X00" indicates that the scheduler will not run the program to download the Web newspaper.

It should be note that inducement values 218 may also be associated with selected dates 212n, such as legal holidays, or with default events for those dates. In a hierarchical scheme, a date inducement value 218 may serve as a global override, or may simply be passed to the scheduler program 204 as another inducement value associated with that date 212n. Such date inducement values 218 for holidays and the like may be unique from event inducements values 216a–216n to result in different affects on selected programs.

Figure 3A:
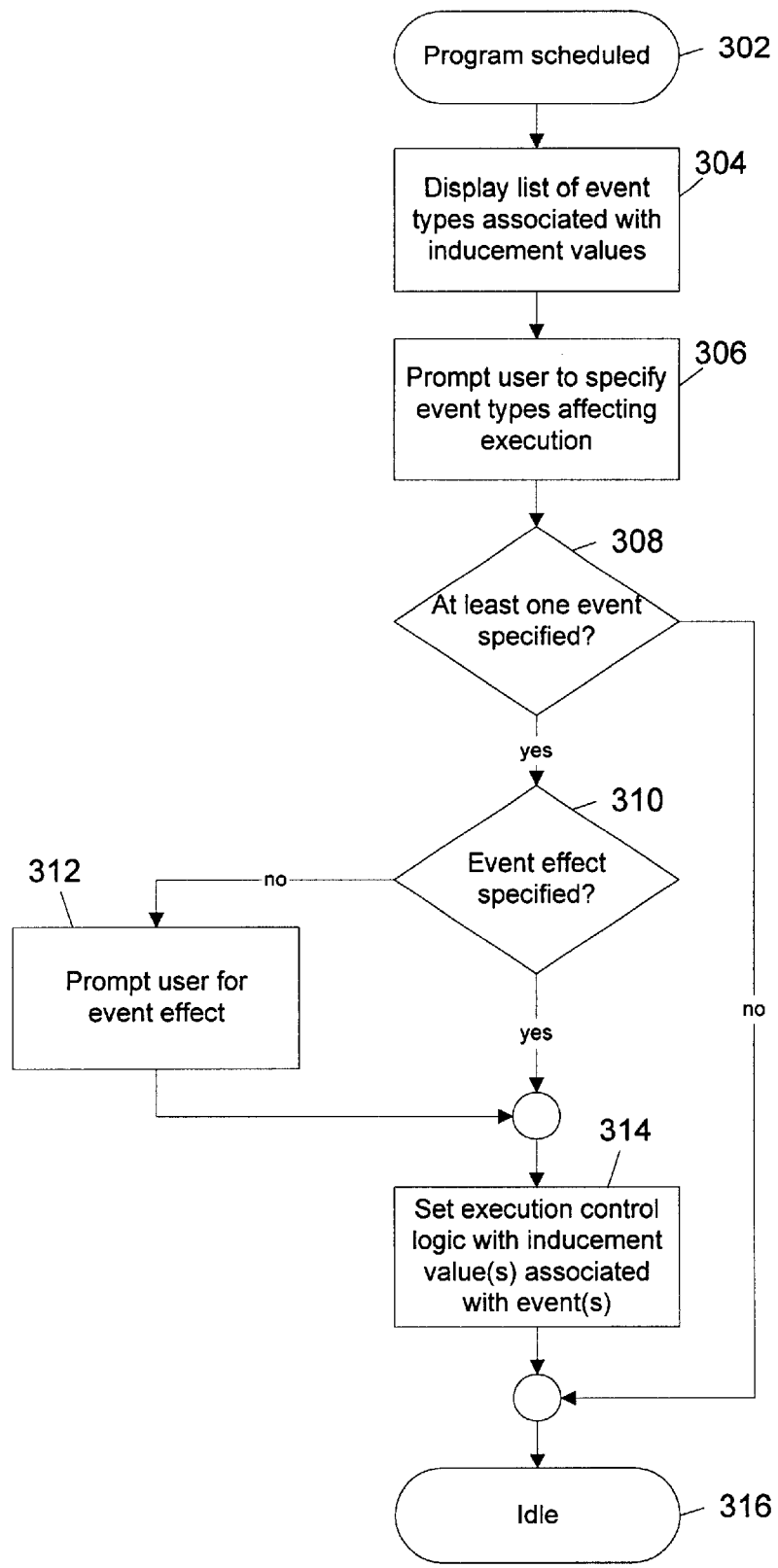
FIG. 3 is high level flowcharts for processes of setting and employing calendar-induced program execution in accordance with a preferred embodiment of the present invention.
Figure 3B:
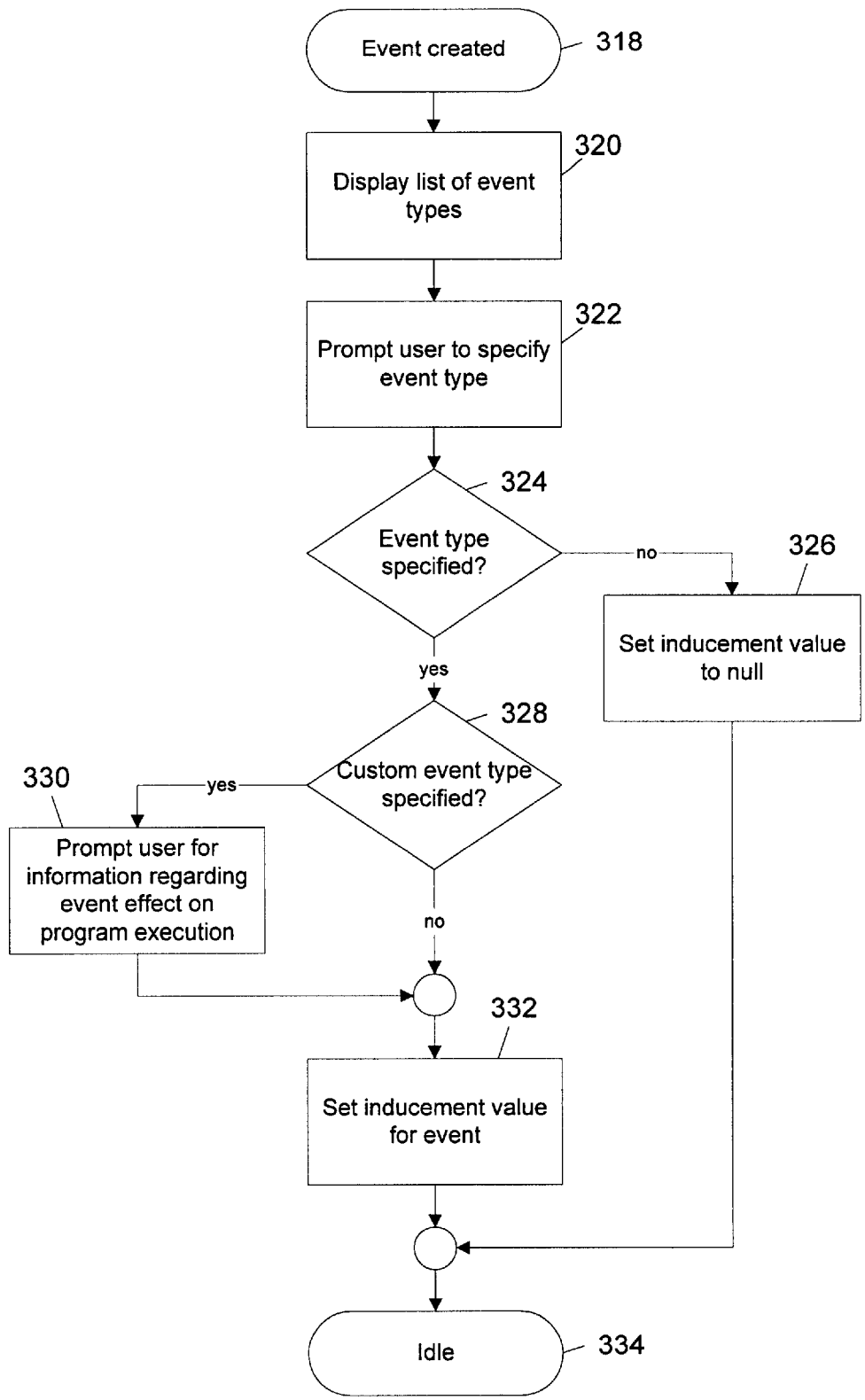
Figure 3C:
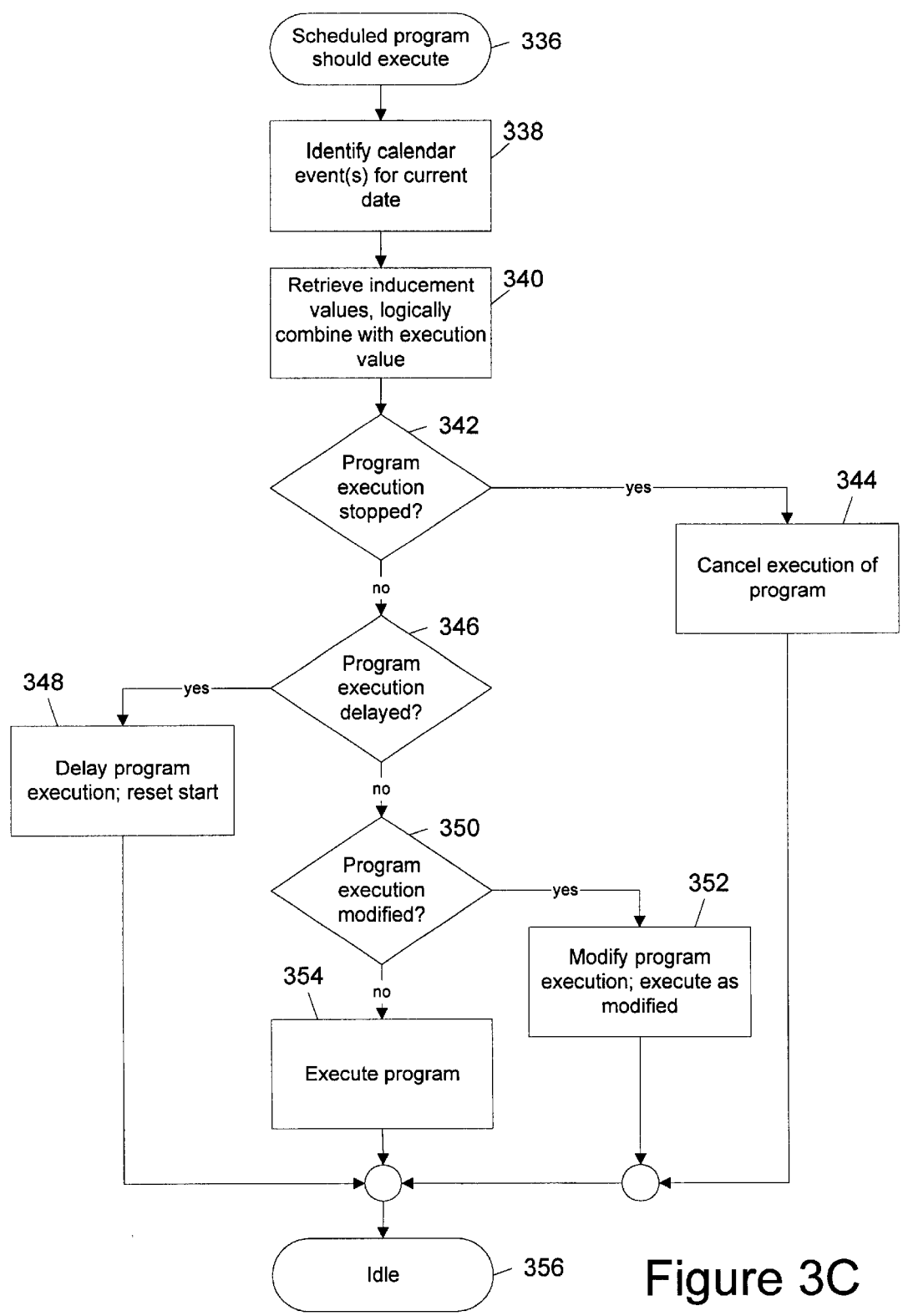

With reference now to FIGS. 3A through 3C, high level flowcharts for processes of setting and employing calendar-induced program execution in accordance with a preferred embodiment of the present invention are depicted. FIGS. 3A and 3B depict a process of setting calendar-induced program execution, which involves specifying event type (inducement value) effect on program execution and specifying event type for event entries within a calendar.

The process of FIG. 3A, which depicts specifying the event type or inducement value effect on program execution, begins at step 302, which depicts a program being scheduled for execution. The scheduled execution may be either recurring (e.g., periodic) or a one-time execution. The process then passes to step 304, which depicts displaying a list of relevant event types and or inducement value representing event types.

The event types and/or inducement values displayed may include a number of predefined event types and associated default inducement values, predefined event types having user-specified inducement values (generated by prompting the user to answer a series of questions regarding effect of the event on program execution), or custom event types created by the user and having user-specified inducement values. It should be noted that the user may not be aware of the inducement values as such, but may specify inducement values for different event types by answering questions (e.g., through execution of a "wizard").

The process next passes to step 306, which depicts prompting the user to specify one or more event types which will affect program execution, and then to step 308, which illustrates a determination of whether at least one event type was specified. If so, the process proceeds to step 310, which depicts a determination of whether the effect of the specified event type is defined. If not, the process proceeds to step 312, which illustrates prompting the user to specify the effect (e.g., "suspend", "delay", etc.) each event type will have on execution of the scheduled program.

If the effect of the selected event type(s) are already defined, or once defined by the user, the process proceeds to step 314, which depicts setting the execution control logic for the scheduled program to be keyed by inducement values (representing event types) associated with calendar events. That is, execution values for the scheduled program are set. The process then passes to step 316, which illustrates the process becoming idle until another program is scheduled for automatic execution.

Referring back to step 308, if no events are specified by the user as affecting program execution, the process passes directly to step 316 without setting any dependence on inducement values within the execution control logic. A user may wish to run some programs, such as a virus checking or security checking utility, regardless of any events scheduled on the user's calendar.

The process of creating event entries in a user's calendar, depicted in FIG. 3B, begins with step 318, which depicts an event being created in a user's calendar program. The process then passes to step 320, which illustrates displaying a list of defined event types (preferably including a "Custom" alternative), and then to step 322, which depicts prompting the user to select an event type for the event created and entered in the calendar program.

The process next passes to step 324, which illustrates a determination of whether an event type was specified. If not, the process proceeds to step 326, which depicts setting an inducement value associated with the entry to a null value, indicating that the event is to have no effect on execution of scheduled programs. If so, however, the process proceeds instead to step 328, which illustrates a determination of whether a "custom" or user-specified event type was selected.

If a custom event type was selected by the user, the process proceeds to step 330, which depicts prompting the user for information regarding the effect of the created calendar event on program execution. If a predefined event type was selected by the user, or once the user specifies the event effect on program execution, the process proceeds to step 332, which illustrates setting the inducement value associated with the created event to define the event effect on scheduled program execution. The process then passes to step 334, which depicts the process becoming idle until another calendar event is created.

The process of employing calendar-induced program execution, depicted in FIG. 3C, begins with step 336, which depicts a scheduler program determining that a scheduled program should execute on a current date at the current time. The process then passes to step 338, which illustrates identifying calendar events, if any, within a user calendar entry for the current date. The process next passes to step 340, which depicts retrieving inducement value(s) associated with any identified calendar event entries on the current date, and logically combining (e.g., ANDing) the inducement values with execution values specified for the scheduled program.

The process the passes to step 342, which illustrates a determination of whether the program execution should be suspended based on the logically combined inducement and execution values. If so, the process proceeds to step 344, which depicts cancelling execution of the scheduled program. If not, however, the process proceeds instead to step 346, which illustrates a determination of whether execution of the scheduled program should be delayed based on the logically combined inducement and execution values.

If so, the process proceeds to step 348, which depicts delaying execution of the scheduled program such as by resetting the start time for the scheduled execution, or by merely deferring execution until the calendared event expires. If not, however, the process proceeds instead to step 350, which illustrates a determination of whether a execution of the scheduled program should be modified based on the logically combined inducement and execution values.

If so, the process proceeds to step 352, which depicts modifying execution of the scheduled program, such as by suppressing user interface dialogs and pop-ups, then executing the program as modified. Otherwise, however, the process proceeds instead to step 354, which illustrates executing the scheduled program, and then to step 356, which depicts the process becoming idle until execution of another scheduled program is required. It should be noted that cancelling, delaying, or modifying program execution based on the logically combined inducement and execution values represent only three possible alternatives as examples. Other alternatives may be possible.

The present invention allows user calendar entries to impact execution of scheduled programs. This may be particularly useful in integrated systems, where components are interrelated and not disjoint or contradictory. Execution of task may thus conform to the users needs, rather that the blind execution of the prior art.

It is important to note that while the present invention has been described in the context of a fully functional data processing system and/or network, those skilled in the art will appreciate that the mechanism of the present invention is capable of being distributed in the form of a computer usable medium of instructions in a variety of forms, and that the present invention applies equally regardless of the particular type of signal bearing medium used to actually carry out the distribution. Examples of computer usable mediums include: nonvolatile, hard-coded type mediums such as read only memories (ROMs) or erasable, electrically programmable read only memories (EEPROMs), recordable type mediums such as floppy disks, hard disk drives and CD-ROMs, and transmission type mediums such as digital and analog communication links.

While the invention has been particularly shown and described with reference to a preferred embodiment, it will be understood by those skilled in the art that various changes in form and detail may be made therein without departing from the spirit and scope of the invention.

What is claimed is:

1. In a data processing system having a calendar function and program applications that may be pre-scheduled for operation, a method of establishing calendar-induced program execution, comprising:

receiving user input of a calendar entry from among a plurality of different types of entries that may be calendared, said input indicating at least a scheduled date at which a calendar event occurs, wherein said entry is placed on a date during which a program configured for automatic execution of a recurring feature is scheduled for execution;

setting an inducement value for said calendar entry from among multiple possible inducement values, each indicating a different level of response by the program and the recurring feature to said calendar entry, wherein a first inducement value provides a first response within said program and said recurring feature that is different from a second response to a second inducement value, and wherein said recurring feature is subject to modification by specific inducement values associated with specific entries; and when said scheduled date arrives, modifying parameters associated with the automatic execution of the recurring feature when said calendar entry has sufficient relevance to alter the execution of said program, wherein said modifying involves logically combining the inducement values with execution values that control execution of scheduled programs.

2. The method of claim 1, further comprising:

associating execution control logic keyed to one or more inducement values with said program scheduled for execution;

configuring the execution control logic to employ inducement values associated with events within a user calendar;

wherein the step of associating includes setting the execution control logic to modify execution of the program when an inducement value is associated with at least one event within a user calendar for the date during which the program is scheduled for execution.

3. The method of claim 1, further comprising:

setting execution control logic to modify execution of the program by suspending execution of the program when a first inducement value is associated with the at least one event and canceling execution of the program when a second inducement value is associated with the at least one event.

4. The method of claim 2, wherein the step of setting the execution control logic to modify execution of the program further comprises:

setting the execution control logic to execute the program in a modified form when a third inducement value is associated with the at least one event.

5. The method of claim 1, further comprising:

prompting a user to enter additional information about an event type entered during entry of the event, wherein the inducement value is automatically determined based on a response given by the user.

6. The method of claim 5, wherein when said program includes pop ups and dialogs requiring user interaction and said event type indicates the user is not available during program execution, said modifying includes disabling said pop ups and said dialogs, wherein said program continues to execute without stalling while waiting for a user response.

7. A method of employing calendar-induced program execution, comprising:
responsive to determining that a program scheduled for execution should execute on a current date, checking a user calendar for event entries associated with the current date;
responsive to identifying at least one event entry within the user calendar associated with the current date:
retrieving an inducement value for the at least one event entry;
modifying the program execution in one of a plurality of ways from among suspending execution of the program, canceling execution of the program, or executing the program in a modified form based on the inducement value, wherein a first inducement value provides program execution according to a first modified form and a second inducement value provides program execution according to a second modified form; and
executing the program in accordance with the inducement value, wherein said program execution is modified.

8. The method of claim 7, wherein the step of retrieving an inducement value for the at least one event entry further comprises:
retrieving inducement values associated with any event entries for the current date in the user calendar.

9. The method of claim 7, wherein the step of executing the program in accordance with the inducement value further comprises:
responsive to detecting a plurality of event entries in the user calendar for the current date, identifying a highest inducement value from among inducement values associated with any of the plurality of event entries; and
executing the program based on the highest inducement value.

10. In a data processing system having a calendar function and program applications that may be pre-scheduled for operation, a system for establishing calendar-induced program execution, comprising:
means for receiving user input of a calendar entry from among a plurality of different types of entries that may be calendared, said input indicating at least a scheduled date at which a calendar event occurs, wherein said entry is placed on a date during which a program configured for automatic execution of a recurring feature is scheduled for execution;
means for setting an inducement value for said calendar entry, said inducement value indicating a level of response to said calendar entry by the program and the recurring feature, wherein a different value of said inducement value provides a different response within said program and said recurring feature, and wherein said recurring feature is subject to modification by specific inducement values associated with specific entries;
means, when said scheduled date arrives, for modifying parameters associated with the automatic execution of the recurring feature when said calendar entry has sufficient relevance to said execution of said program; wherein said means for modifying parameters includes:
means, responsive to detecting a plurality of event entries in a user calendar for the current date, for:
identifying a highest inducement value from among inducement values associated with any of the plurality of event entries; and executing the program based on the highest inducement value.

11. The system of claim 10, further comprising:
execution control logic keyed to one or more inducement values and associated with a program scheduled for execution; and
an inducement value for at least one user calendar entry on a date during which the program is scheduled for execution;
wherein the execution control logic is configured to check the date within a user calendar for events having an associated inducement value; and
wherein the execution control logic further comprises control logic modifying execution of the program when an inducement value is associated with at least one event within a user calendar for the date during which the program is scheduled for execution.

12. The system of claim 11, further comprising: an execution control topic keyed to one or more inducement values and associated with a program scheduled for execution means, wherein the control logic suspends execution of the program when a first inducement value is associated with the at least one event and cancels execution of the program when a second inducement value is associated with the at least one event.

13. The system of claim 12, wherein the control logic executes the program in a modified form when a third inducement value is associated with the at least one event.

14. The system of claim 10, further comprising:
means for prompting a user to enter additional information about an event type entered during entry of the event, wherein the inducement value is automatically determined based on a response given by the user.

15. The system of claim 14, wherein when said program includes pop ups and dialogs requiring user interaction and said event type indicates the user is not available during program execution, said means for modifying includes means for disabling said pop ups and said dialogs, wherein said program continues to execute without stalling while waiting for a user response.

16. A system for employing calendar-induced program execution, comprising:
means, responsive to determining that a program scheduled for execution should execute on a current date, for checking a user calendar for event entries associated with the current date;
means, responsive to identifying at least one event entry within the user calendar associated with the current date, for:
retrieving an inducement value for the at least one event entry; and
executing the program in accordance with the inducement value, wherein execution of said program is modified according to said inducement value, and wherein said means for executing the program in accordance with the inducement value further comprises:
means, responsive to detecting a plurality of event entries in the user calendar for the current date, for identifying a highest inducement value from among inducement values associated with any of the plurality of event entries; and
means for executing the program based on the highest inducement value.

17. The system of claim 16, wherein the means for retrieving an inducement value for the at least one event entry further comprises:

means for retrieving inducement values associated with any event entries for the current date in the user calendar.

18. The system of claim 16, wherein the means for executing the program in accordance with the inducement value further comprises:
   means for modifying a program execution according to one of a plurality of options including suspending execution of the program, canceling execution of the program, or executing the program in a modified form based on the inducement value, wherein a first inducement value provides program execution according to a first modified form and a second inducement value provides program execution according to a second modified form.

19. A computer program product within a computer usable medium for establishing calendar-induced program execution, comprising:
   instructions for receiving user input of a calendar entry from among a plurality of different types of entries that may be calendared, said input indicating at least a scheduled date at which a calendar event occurs, wherein said entry is placed on a date during which a program configured for automatic execution of a recurring feature is scheduled for execution;
   instructions for setting an inducement value for said calendar entry, said inducement value indicating a level of response to said calendar entry by the program and the recurring feature, wherein a different value of said inducement value provides a different response within said program and said recurring feature, and wherein said recurring feature is subject to modification by specific inducement values associated with specific entries; and
   instructions for modifying parameters associated with the automatic execution of the recurring feature when said scheduled date arrives and said calendar entry has sufficient relevance to said execution of said program.

20. The computer program product of claim 19, further comprising:
   instructions for associating execution control logic keyed to one or more inducement values with a program scheduled for execution;
   instructions for setting an inducement value for at least one user calendar entry on a date during which the program is scheduled for execution; and
   instructions for configuring the execution control logic to check the date within a user calendar for events having an associated inducement value;
   wherein the instructions for associating execution control logic flirter comprise instructions for setting the execution control logic to modify execution of the program when an inducement value is associated with at least one event within a user calendar for the date during which the program is scheduled for execution.

21. The computer program product of claim 20, further comprising:
   instructions for setting the execution control logic to modify execution of the program when an inducement value is associated with at least one event within a user calendar
   for the date during which the program is scheduled for execution including suspending execution of the program when a first inducement value is associated with the at least one event and canceling execution of the program when a second inducement value is associated with the at least one event.

22. The computer program product of claim 19, further comprising:
   instructions for setting an execution control logic to modify execution of the program when an inducement value is associated with at least one event within a user calendar for the date during which the program is scheduled for execution;
   by executing the program in a modified form when a third inducement value is associated with the at least one event.

23. A computer program product within a computer usable medium for employing calendar-induced program execution, comprising:
   instructions, responsive to determining that a program scheduled for execution should execute on a current date, for checking a user calendar for event entries associated with the current date; and
   instructions, responsive to identifying at least one event entry within the user calendar associated with the current date, for retrieving an inducement value for the at least one event entry and executing the program in accordance with the inducement value, wherein said program execution is modified and wherein the instructions for executing the program in accordance with the inducement value further comprise:
      instructions, responsive to detecting a plurality of event entries in the user calendar for the current date, for identifying a highest inducement value from among inducement values associated with any of the plurality of event entries; and
      executing the program based on the highest inducement value.

24. The computer program product of claim 23, wherein the instructions for retrieving an inducement value for the at least one event entry further comprise:
   instructions for retrieving inducement values associated with any event entries for the current date in the user calendar.

25. The computer program product of claim 23, wherein the instructions for executing the program in accordance with the inducement value further comprise:
   instructions for modifying the program execution in one of a plurality of ways including suspending execution of the program, canceling execution of the program, or executing the program in a modified form based on the inducement value, wherein a first inducement value provides program execution according to a first modified form and a second inducement value provides program execution according to a second modified form.

26. The computer program product of claim 23, further comprising:
   instructions for prompting a user to enter additional information about an event type entered during entry of the event, wherein the inducement value is automatically determined based on a response given by the user.

27. The computer program product of claim 26, wherein when said program includes pop ups and dialogs requiring user interaction and said event type indicates the user is not available during program executions, said instructions for completing said modifying step includes instructions for disabling said pop ups and said dialogs, wherein said program continues to execute without stalling while waiting for a user response.

28. A method of employing calendar-induced program execution, comprising:

responsive to arrival of start time for an event within a user calendar, determining whether an inducement value is associated with the event, said inducement value indicating a level of response to said calendar entry by the program and the recurring feature, wherein a different value of said inducement value provides a different response within said program and said recurring feature, and wherein said recurring feature is subject to modification by specific inducement values associated with specific entries; and responsive to identifying an inducement value associated with the event, transmitting the inducement value to a program scheduler; and controlling, utilizing the inducement value within the program scheduler, execution of a program that is scheduled to executed during the event, wherein controlling the execution of the program by utilizing the inducement value further includes:

responsive to detecting a plurality of event entries in the user calendar for the current date, identifying a highest inducement value from among inducement values associated with any of the plurality of event entries; and executing the program based on the highest inducement value.

* * * * *